Figure 1:
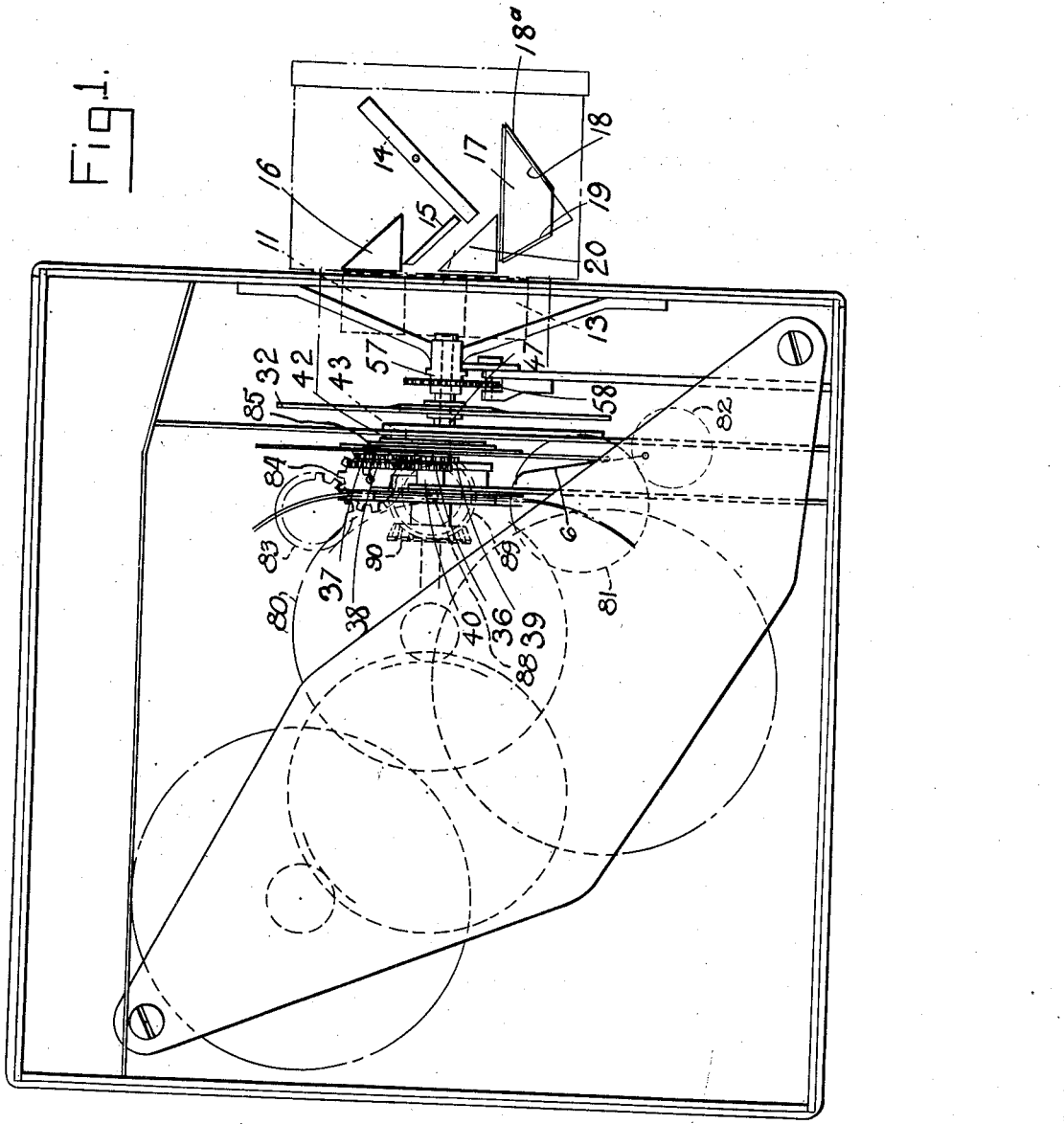

April 30, 1940.   A. G. HILLMAN   2,199,203
PRODUCTION OF CINEMATOGRAPHIC EFFECTS IN COLOR AND MEANS THEREFOR
Filed April 3, 1937    5 Sheets-Sheet 3

INVENTOR
Albert George Hillman
BY
Albert F. Nathan
ATTORNEY.

April 30, 1940.   A. G. HILLMAN   2,199,203
PRODUCTION OF CINEMATOGRAPHIC EFFECTS IN COLOR AND MEANS THEREFOR
Filed April 3, 1937   5 Sheets-Sheet 4

INVENTOR
Albert George Hillman
BY
Albert F. Nathan
ATTORNEY.

April 30, 1940.  A. G. HILLMAN  2,199,203
PRODUCTION OF CINEMATOGRAPHIC EFFECTS IN COLOR AND MEANS THEREFOR
Filed April 3, 1937   5 Sheets-Sheet 5

INVENTOR
Albert George Hillman
BY
Albert F. Nathan
ATTORNEY.

Patented Apr. 30, 1940

2,199,203

UNITED STATES PATENT OFFICE 2,199,203

PRODUCTION OF CINEMATOGRAPHIC EFFECTS IN COLOR AND MEANS THEREFOR

Albert George Hillman, Maidenhead, England

Application April 3, 1937, Serial No. 134,874
In Great Britain April 17, 1936

12 Claims. (Cl. 88—16.4)

This invention relates to a method of and means for producing negative bands containing a single series of color constituent images (hereinafter called negatives) which are suitable for producing corresponding positive constituents (hereinafter called positives) which may be projected on the screen in such a way as to give pictures in substantially natural colors.

In the production of cinematographic effects according to the three color principle, the taking of a single color constituent negative at each stationary period of the film is unsatisfactory, for when dealing with fairly rapid motion in the scene being photographed, the time between exposures is sufficiently great to cause such lack of registration, i. e., identity of outline between the complementary negatives as to give rise to considerable color fringing when the positives are projected. If on the other hand three constituent negatives are taken simultaneously with an ordinary time exposure, then an excessive length of film is required which does not conform to the commercial requirements of the sound synchronisation with the pictures; special methods are required to reduce the time of shift and these tend to produce extra tension on the film.

An object of the invention is to produce negatives suitable for the three color process of such a character that the positives taken therefrom can be projected with apparatus employing the standard picture pull and with a reduction in that objectionable color fringing which is consequent upon a combining on the screen color constituents recording different phases of motion.

Films made according to this process are particularly adapted for projection according to the process forming the subject of our concurrent application No. 134,875.

According to one feature of this invention the picture spaces are simultaneously exposed in pairs, so that at alternate periods of projection on the screen in the manner described in the aforesaid application, two frames, i. e., positive constituent color images in the same phase, are thrown on the screen. In order to accomplish this we expose such pair twice, each picture space receiving light through the same or a similar color filter at each exposure. This enables the pictures to be carried out with a single shift camera, and also enables the two exposures of each picture space to be of different values, as hereinafter explained.

The images may be produced by separate beams, but in order to reduce parallax effects, it is preferable to form the images by dividing a main beam into branch beams, and in the preferred way of carrying out the invention three branch paths are formed, but the outside branches are alternately obturated at successive exposure periods by auxiliary shutters so as to allow only two picture frames to be exposed at any one time.

I also prefer to give each picture frame exposures of different value, giving what I term a full exposure at one stationary period of the film and an exposure of considerably less chromatic effect at another stationary period.

For the purpose of carrying out the process I may provide a camera constructed with these windows, objectives situated so as to cast image-carrying beams through said windows and with provisions for intermittently moving the film by one picture frame at a time and with a filtering device mounted for drive so that two appropriate filters of the different color values are in the path of the image-producing beams at each exposure period and at each exposure of a new pair of frames one of the filters previously in the path of a beam is replaced by a filter of a third color. Auxiliary shutters are provided for alternately obturating the outside windows so that at each exposure period only two of the windows are open.

The camera may incorporate means for running the filter device and/or the auxiliary shutter from a continuously rotating main shaft through an accelerating and decelerating drive so that fast movement of the auxiliary shutter takes place during the cover period of the film, and movement of the filter device takes place intermittently in synchronism with the shift of the film.

Figure 2:
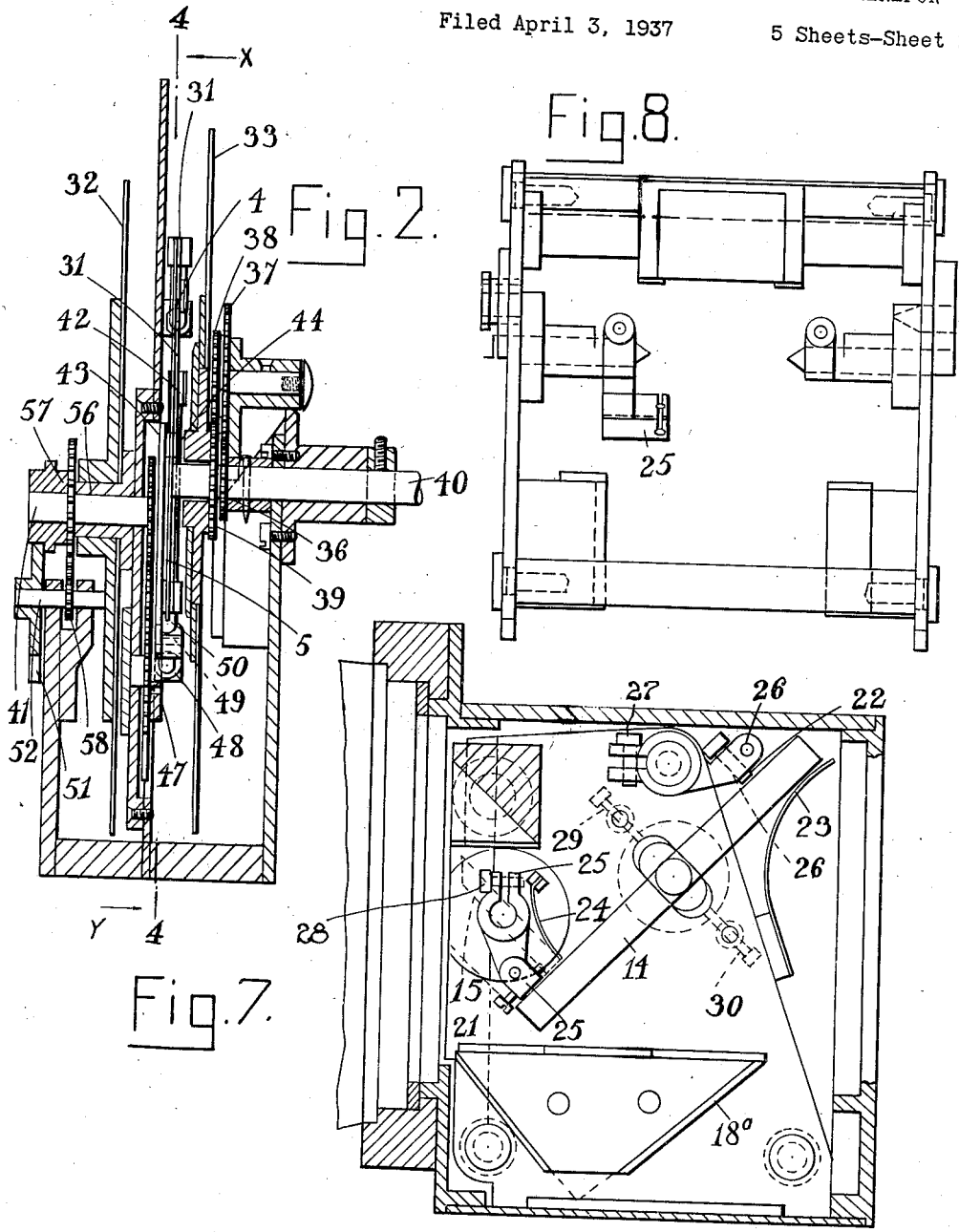
Figure 3:
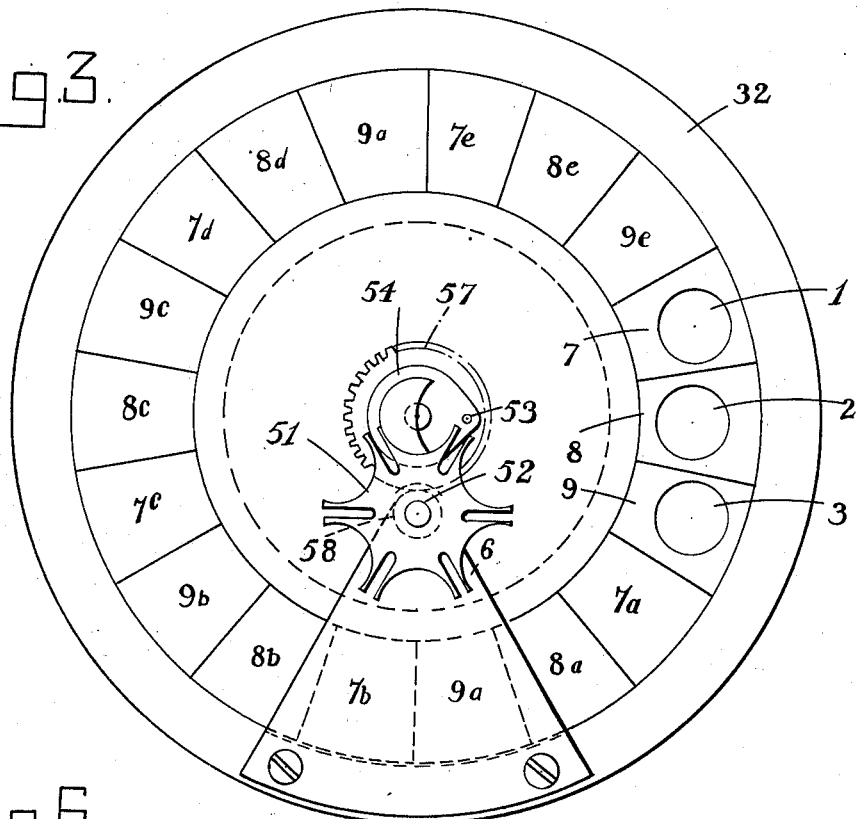
Figure 6:
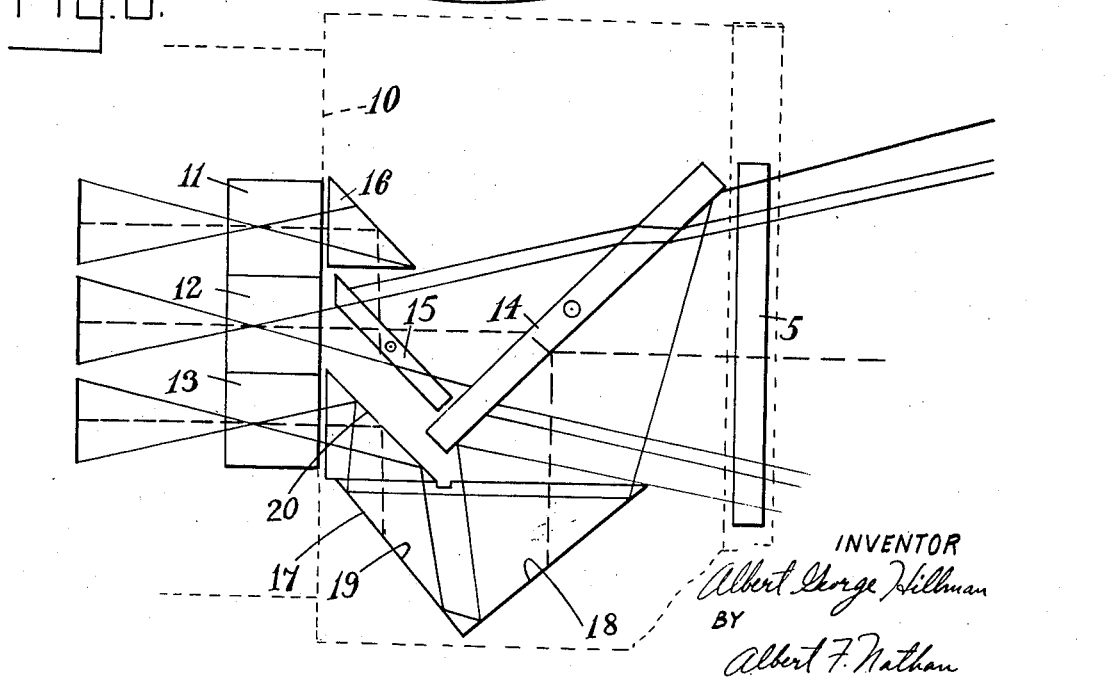
Figure 4:
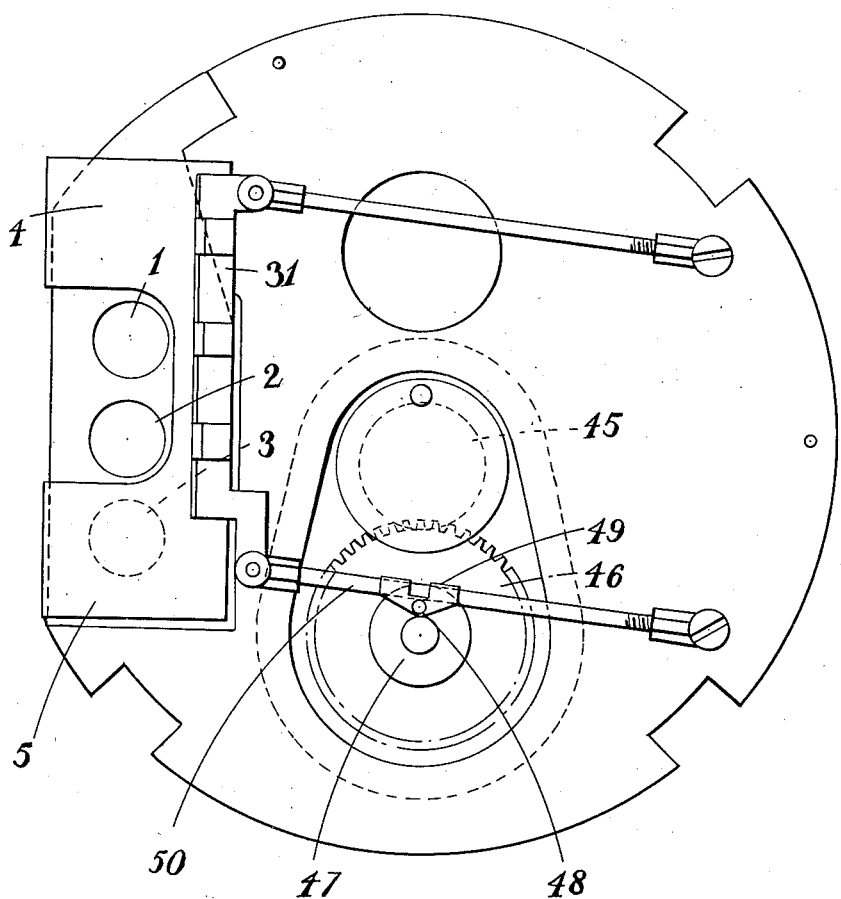
Figure 5:
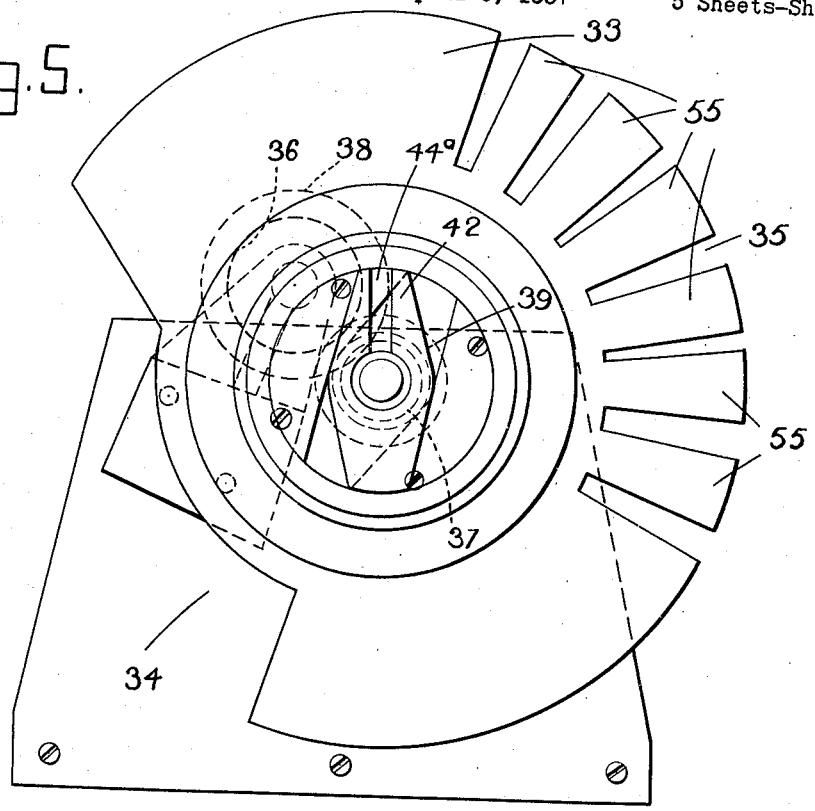
Figure 10:
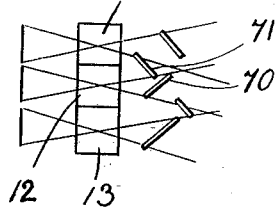
Figure 9:
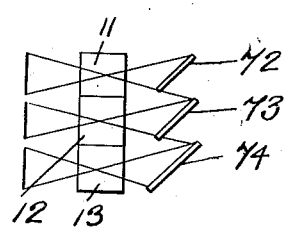

A form of camera suitable for carrying out the invention by the preferred method above referred to is illustrated by way of example in the accompanying drawings, in which:

Fig. 1 is a general side elevation of the camera; Fig. 2 is a longitudinal sectional view through the shutters and filter mechanisms and their mountings; Fig. 3 is a front view of Fig. 2, Fig. 4 is a view looking in the direction of the arrow X on the line 4—4 and Fig. 5 in the direction of the arrow Y on the line 4—4 of Fig. 2. Fig. 6 is an elevation of the light dividing system, and Figs. 7 and 8 are part-sectional side elevation and a front elevation of the box for containing the light dividing system, the latter being shown in position in Fig. 7. Figs. 9 and 10 show diagrammatically certain modified forms of light dividing systems.

The camera shown in the drawings is provided with three windows 1, 2, 3 arranged to illuminate three adjacent picture areas of a standard size film and shutters 4, 5 are provided for alternately covering the top and bottom windows so that at each alternate stationary period of the film the middle and bottom windows will be exposed and at the intervening stationary periods the middle and top windows will be exposed. The film is moved down with the standard single picture pull by means for example of the standard claw pull 6 which is preferably driven by any suitable accelerated shift mechanism, and the filters 7, 7a . . . 8, 8a . . . 9, 9a . . . are so arranged, or so change their position during the shift of the film, that each pair of adjacent images is exposed twice through the same or a similar color filter.

For example, assume that whilst the bottom window is covered an image is taken in the top window through a red filter 7 and another image is taken in the middle window through a green filter 8, then after a shift of the film, the top window will be covered, the red constituent image taken in the top window will be again exposed through the same or a similar color filter in the middle window, and the green constituent image taken in the middle window will be again exposed through the same or a similar color filter in the bottom window. The picture area covered in the top window is destined to receive an exposure through the blue filter 9, and it is so exposed, after the next shift of the film, in the middle window, the picture area in the top window being then exposed through a green filter and the red constituent which has already been exposed twice being covered in the bottom window. These blue and green constituents are again exposed in the bottom and middle windows respectively after the next film shift. The next shift of the film brings the picture area which was last shuttered in the top window into position to receive an exposure in the middle window through the red filter whilst the next following area is exposed in the top window through a blue filter. These red and blue constituents receive a further exposure in the bottom and middle windows respectively at the next stationary period, and after the next film shift red and green constituents are taken in the top and middle windows respectively and the cycle is repeated.

It is preferred to give the picture pair in the uncovered windows exposure to branches of one main beam. This may be effected by any convenient light dividing and directing system, such as the system 10 used in conjunction with three matched lenses 11, 12, 13. One advantageous optical combination for this purpose comprises three obectives arranged one below the other, one to each window and having arranged in front of the middle objective a pair of reflectors 14, 15 lying in intersecting planes and of such a character as to permit part of the incoming beam to pass therethrough and through the middle lens to form one constituent image, another part of the beam to be reflected by the back reflector 15 on to a further reflecting prism 16 arranged before the top obective so as to reflect such part therethrough to form the image in the top window, and another part to be reflected from the front reflector 14 to a prism system 17 arranged before the lower objective so as to reflect this part through such objective to form the third image. The prism system 17 comprises reflecting surfaces 18, 19, 20 which reflect light received from reflector 14 to the lower objective.

The multiple prism device 17 may be fitted in a predetermined fixed position in its housing by the aid of accurately arranged plane supporting surfaces, e. g., in a supporting cradle 18a, and the reflectors 14 and 15 and the single prism 16 may be appropriately rotatably mounted so as to obtain, usually with the aid of photographic tests, the correct spacing of the images and their desired true orientation on the film.

For this purpose it is convenient to mount each reflector 14, 15 so that it is rotatable about an axis at right angles to the film length for the purpose of adjusting for picture pitch, i. e., spacing of the images, the adjustments preferably being effected by fine screws 21, 22 against the action of opposing springs 23, 24. The screws are preferably arranged in split clamps 25, 26 which can be freed to allow of adjustment being effected but have provision, such as screw means 27, 28, for clamping the adjusting screws in fixed position when adjustment is made. The pivot pins of the reflectors are also adjustable, e. g., by the action of opposed push and pull screws 29, 30. One pivot pin of each reflector may be movable in a slot in the casing under the action of the push and pull screws while the other pivot pin remains in the same position. It is generally sufficient to mount the single prism so that it is rotatable about only one axis for the purpose of bringing its emergent face parallel to the film track, only a very slight range of adjustment being ordinarily necessary for this purpose, the main adjustments being by means of the reflectors 14 and 15.

The optical light-dividing system just described is applicable to various processes other than that herein described.

The light dividing system may alternatively take the form of a reflector disc 70 arranged within a reflector ring 71 (Fig. 10), the direct light passing between the ring and the disc and/or through the disc, and the reflector may be shaped and arranged so as to apportion the light effectively and ensure even illumination of the respective images. Another form of divider (see Fig. 9) which is applicable comprises a top reflector 72 which receives the main beam and is perforated to allow part of such beam to pass through the corresponding objective and is situated at such an angle as to reflect part of the beam onto a second reflector 73 arranged in an appropriately inclined position in front of the middle objective, this second reflector being apertured to permit the passage therethrough of a predetermined part of the light reflected from the first reflector on to a third reflector 74 appropriately arranged to reflect such part through the lower objective.

The shutters 4, 5 for alternately covering first the top window and then the lower one are mounted on an oscillating bifurcated frame 31, the limbs of which form the shuttering portions and the space between the shutters being such as to expose two picture areas at a time.

The filters are arranged in groups of three around the margins of the disc 32 which is rotatable under the control of a step by step mechanism.

The main shutter 33 is provided with two exposure apertures 34 and 35 so as to give two exposures in each revolution, and it is mounted so as to derive its drive through spur gears 36, 37, 38, 39 from the main shaft 40. The spur wheel 36 is fast on the main shaft and the spur wheel 39 is fast with the shutter which is freely mounted on such shaft, the wheels 37 and 38 being fast with one another on the lay shaft.

The drive for the rotating shutter shaft 40 and of the claw mechanism 6 may be derived from the usual spring motors, the common toothed wheel 80 being geared up to the motors in the usual way. This wheel 80 drives toothed wheels 81, 82 which are related to the claw mechanism 6 in the known way. The drive of the shutter shaft 40 from the wheel 80 is through a toothed wheel 83 and another 84 on the shaft 85 which carries a toothed wheel (not shown) meshing with another wheel (not shown) on a shaft 88 which carries a bevel wheel 89 engaging with a bevel wheel 90 on the shutter shaft 40.

The main shaft is abaxial with regard to another shaft 41 (hereinafter termed the accelerated shaft) and is arranged to drive the accelerated shaft by means of a pin and slot coupling. For this purpose a slotted arm 42 is mounted on the end of the main shaft and the accelerated shaft carries a crank pin disc 43 whose pin 44 engages in the slot 44a the abaxiality of the two shafts resulting in the pin moving along the slot as the shafts rotate and so imparting an accelerated movement to the shaft 41 as the pin approaches the open end of the slot.

This accelerated motion is utilised to give the auxiliary shutters 4, 5 a rapid movement during the time that the main shutter is covering the exposure windows, the drive to the auxiliary shutters being effected from the accelerated shaft through spur wheels 45 and 46 and a crank disc 47 whose pin 48 engages with a slide 49 guided for movement to and fro along the limb 50 of the oscillating shutter frame.

The accelerated shaft also controls the movement of a Maltese cross 51 which is mounted on a lay shaft 52 and engaged by a pin 53 on a disc 54 fast with the accelerated shaft. The filter carrier 32 is loosely mounted on the boss 56 which forms a bearing for the accelerated shaft and it is provided with a spurwheel 57 which is driven by a pinion 58 fast with the Maltese cross shaft 52 so as to receive a step by step movement in synchronism with the feed of the film.

The gearing is so arranged that the filter carrier moves one filter forward at each shift of the film.

The method and means according to application Serial No. 755,527 (now Patent No. 2,073,798), may be applied to the present invention for permitting each image to be produced by exposures of unequal amounts, the shutter illustrated having a series of radial obturating arms 55 in the exposure aperture 35 for this purpose.

It is preferred to project the positive band obtained from the negative band produced as hereindescribed in the manner described in our concurrent application No. 134,875 filed April 3, 1937.

For this purpose preferably from the negative obtained as hereinabove described, a monotone positive transparency film is made for use in the cinematograph projecting apparatus which may be of the standard type except that it has a two picture gate and provision is made for interchanging the standard lens with a pair of lenses having appropriate adjustment for accurately superposing the alternating color sensations on the sheet, and for interposing the appropriate color filters in the path of the beams, the successive projection of each color sensation as it passes through the gate being arranged to be made through its corresponding color filters in a like or similar way to that which governs the double exposure in the camera.

In a variant way of producing cinematographic effects in color from a negative band obtained under the present invention, a positive band may be produced therefrom, in which each picture is a complete heliochrome, such heliochrome reconstitution from the negative band being made by any selective printing process in which the color analysis elements are mechanically selected from the negative band and the positive prints thus selected brought to correct colors.

Since there will be produced consecutive pairs of images and the individual images of each pair have been exposed twice from the same point of view, then if the images are projected in pairs and the film is shifted one picture area at a time in the projector, at each alternate exposure two color constituents will be superposed which are alike as regards motion analysis and no fringing should occur, whilst at other projections the two images are the result of negatives separated in time by only one picture shift in the camera. The time of film shift can be so decreased by any convenient film-shift accelerating means that the two images projected at such other projections bear the minimum difference in motion analysis.

What I claim is:

1. A camera for producing a negative band of color constituent images comprising three picture frame windows and objectives situated so as to cast image-carrying beams through said windows, means for intermittently moving the band so as to cause the picture frames on the band to be positioned successively in said windows, means for exposing and shuttering the windows, auxiliary shuttering means for alternately obturating the outside windows so that at each exposure period only two of the windows are open, a filter device mounted for drive in timed relationship with the auxiliary shutter so as to bring two different filters into the path of the image-producing beams at each exposure period and at each exposure of a new pair of picture frames to replace one of the filters previously in the path of a beam by a filter of a third color, a main shaft and another shaft coupled to said main shaft so as to be driven thereby at alternately accelerating and decelerating speeds, the filter device being connected for drive by the latter shaft so as to move intermittently in timed relationship to the movement of the film.

2. Process for the production on a negative band of color constituent images forming one continuous series wherein the negatives are produced in groups of three color constituents along the length of the band, which consists in producing three image-carrying beams alternately obturating the outside beams so that at each exposure period only two picture frames are exposed, differently filtering such beams and exposing two picture frames one to each of the differently colored beams, shifting the band between exposures so as to cause such pair of frames to be again exposed to image-carrying filtered beams of the same or a similar color as before and at each exposure of a new pair of picture frames filtering the image carrying beams to produce one color beam corresponding to one of the beams of the previous exposure and one of another color so that each picture frame is exposed once before a shift of the band and once after and the images are produced in recurring groups of three color constituents along the length of the band, and so controlling the exposures that each pair of picture frames is given a full exposure at one stationary period of the band and an exposure of considerably less chromatic effect at another stationary period of the band.

3. Process for the production on a negative band of color constituent images forming one continuous series, wherein the negatives are produced in groups of three color constituents along the length of the band, which consists in producing a main beam and dividing such beam into three branch beams, alternately obturating the outside beams so that at each exposure period only two picture frames are exposed, differently filtering such beams and exposing two picture frames one to each of the differently colored beams, shifting the band between exposures so as to cause such pair of frames to be again exposed to image-carrying filtered beams of the same or a similar color as before and at each exposure of a new pair of picture frames filtering the image carrying beams to produce one color beam corresponding to one of the beams of the previous exposure and one of another color so that each picture frame is exposed once before a shift of the band and once after and the images are produced in recurring groups of three color constituents along the length of the band, and causing one of such exposures of each pair of frames to be at full exposure at one stationary period of the band and the other exposure at another stationary period of the band to be of considerably less chromatic effect.

4. A camera for producing a negative band of color constituent cinematograph images comprising three picture area windows, objectives situated so as to cast image-carrying beams through said windows, means for intermittently moving the band so as to cause the picture areas on the band to be positioned successively in said windows, means for exposing and shuttering the windows, auxiliary shutters for alternately obturating the outside windows so that at each exposure period only two of the windows are open, a filtering device so mounted for drive that different color filters are in the paths of the two image producing beams at each exposure period and at each third exposure period one of the filters, or a filter corresponding in color to one of the filters, of the previous pair is in the path of one beam and a filter of a third color is in the path of the other beam.

5. A camera for producing a negative band of color constituent cinematograph images comprising three picture area windows, objectives situated so as to cast image-carrying beams through said windows, means for intermittently moving the band so as to cause the picture areas on the band to be positioned successively in said windows, means for exposing and shuttering the windows, auxiliary shutters for alternately obturating the outside windows so that at each exposure period only two of the windows are open, a filter device mounted for drive in timed relationship with the auxiliary shutters so as to bring two different filters into the path of the image-producing beams at each exposure period and at each exposure of a new picture frame or frames to replace one of the filters previously in the path of a beam by a filter of a third color.

6. A camera for producing a negative band of color constituent images comprising three picture frame windows and objectives situated so as to cast image-carrying beams through said windows, means for intermittently moving the band so as to cause the picture frames on the band to be positioned successively in said windows, means for exposing and shuttering the windows, auxiliary shuttering means for alternately obturating the outside windows so that at each exposure period only two of the windows are open, said auxiliary shutters being mounted on an oscillating frame, a crank mechanism for operating said frame, and a filter device mounted for drive in timed relationship with the auxiliary shutter so as to bring two different filters into the path of the image-producing beams at each exposure period and at each exposure of a new pair of picture frames to replace one of the filters previously in the path of a beam by a filter of a third color, a main shaft and another shaft coupled to said main shaft so as to be driven thereby at alternately accelerating and decelerating speeds, the filter device being connected for drive by the latter shaft so as to move intermittently in timed relationship to the movement of the film, said crank mechanism being also driven through a reduction gear, from said accelerating and decelerating shaft.

7. Process for the production on a negative band of color constituent images forming one continuous series, wherein the negatives are produced in groups of three color constituents along the length of the band, which consists in producing three image-carrying beams, obturating one outside beam of the said three and differently filtering the other two beams and exposing two picture frames one to each of the differently colored beams, shifting the band following said exposures, again producing three beams and obturating the other of the two outside beams and causing such pair of frames to be again exposed to image-carrying filtered beams of the same or a similar color as before and at each exposure of a new pair of picture frames filtering the image carrying beams to produce one color beam corresponding to one of the beams of the previous exband and once after and the images are produced posure and one of another color so that each picture frame is exposed once before a shift of the in recurring groups of three color constituents along the length of the band.

8. Process for the production on a negative band of color constituent images forming one continuous series, wherein the images are produced in groups of three color constituents along the length of the band, which consists in producing a main beam and dividing such beam into three component image-carrying beams, obturating one outside beam of the said three and differently filtering the individual beams of the remaining two and exposing two picture frames one to each of the differently colored beams, shifting the band after each exposure of a pair of picture frames by one picture frame, and again producing three component beams, obturating the other outside beam and exposing said pair of picture frames and at each exposure of a new picture frame filtering the image-carrying beams to produce one color beam corresponding to one of the beams of the previous exposure and one of another color so that each picture frame is exposed with the same companion picture frame once before a shift of the film and once after and the images are produced in recurring groups of three color constituents along the length of the band.

9. A camera for producing a negative band of color constituent images comprising three picture frame windows and objectives situated so as to cast image-carrying beams through said windows, means for intermittently moving the band so as to cause the picture frames on the band to be positioned successively in said windows, a shutter device for exposing and shuttering the windows, auxiliary shuttering means for alternately obturating the outside windows so that at each exposure period only two of the windows are open, a filter device mounted for drive in timed relationship with the auxiliary shutter so as to bring two different filters into the path of the image-producing beams at each exposure period and at each exposure of a new pair of picture frames to replace one of the filters previously in the path of a beam by a filter of a third color, a main shaft, said shutter device being mounted for drive at uniform speed from said main shaft, another shaft coupled to said main shaft so as to be driven thereby at alternately accelerating and decelerating speeds, oscillatable means including an oscillatable rod operatively connected to said auxiliary shutters, a crank operable from said alternately accelerating and decelerating shaft and a crank slider on said crank for rocking said rod, the decelerated movement of said crank being arranged to occur when the auxiliary shutters are to remain substantially stationary during the exposure period.

10. A camera for producing a negative band of color constituent images comprising three picture frame windows and objectives situated so as to cast image-carrying beams through said windows, means for intermittently moving the band so as to cause the picture frames on the band to be positioned successively in said windows, means for exposing and shuttering the windows, auxiliary shuttering means for alternately obturating the outside windows so that at each exposure period only two of the windows are open, a filter device mounted for drive in timed relationship with the auxiliary shutter so as to bring two different filters into the path of the image-producing beams at each exposure period and at each exposure of a new pair of picture frames to replace one of the filters previously in the path of a beam by a filter of a third color, a main shaft and another shaft, said shafts being supported in parallel abaxial relationship, a coupling between said shafts comprising a member with a radial slot on one of said shafts and a member on the other of said shafts carrying an eccentric pin which works in said slot whereby rotation of said main shaft rotates said second shaft at alternately accelerating and decelerating speeds, the filter device being connected for drive by the latter shaft so as to move intermittently in timed relationship to the movement of the film, said auxiliary shutter being pivotally carried by oscillating means including an oscillating rod, a crank operable from said second shaft and a slider on said crank for rocking said rod, said decelerating movement of the shaft corresponding with the travel of the crank slider substantially tangential to the rod while no substantial movement of the auxiliary shutter is to take place and the exposure is to be made.

11. A camera for producing a negative band of color constituent cinematograph images comprising three picture area windows, objectives situated so as to cast image-carrying beams through said windows, means for intermittently moving the band so as to cause the picture areas on the band to be positioned successively in said windows, means for exposing and shuttering the windows, auxiliary shutters for alternately obturating the outside windows so that at each exposure period only two of the windows are open, said auxiliary shutters being mounted on an oscillating frame, a crank mechanism for operating said frame, a filtering device mounted for drive so that different color filters are in the paths of the two image producing beams at each exposure period and at each third exposure period one of the filters, or a filter corresponding in color to one of the filters, of the previous pair is in the path of one beam and a filter of a third color is in the path of the other beam.

12. A camera for producing a negative band of color constituent cinematograph images comprising three picture area windows, objectives situated so as to cast image-carrying beams through said windows, a light dividing and directing device for dividing a main beam into branch beams and directing said branch beams through said objectives, means for intermittently moving the band so as to cause the picture areas on the band to be positioned successively in said windows, means for exposing and shuttering the windows, auxiliary shutters for alternately obturating the outside windows so that at each exposure period only two of the windows are open, a filtering device so mounted for drive that different color filters are in the paths of the two image producing beams at each exposure period and at each third exposure period one of the filters, or a filter corresponding in color to one of the filters, of the previous pair is in the path of one beam and a filter of a third color is in the path of the other beam.

ALBERT GEORGE HILLMAN.